US010818002B1

(12) United States Patent
Dagley et al.

(10) Patent No.: US 10,818,002 B1
(45) Date of Patent: Oct. 27, 2020

(54) SYSTEMS AND METHODS FOR PROCESSING IMAGES BASED ON CRITERIA

(71) Applicant: Capital One Services, LLC, McLean, VA (US)

(72) Inventors: Geoffrey Dagley, McKinney, TX (US); Qiaochu Tang, The Colony, TX (US); Micah Price, Plano, TX (US); Avid Ghamsari, Plano, TX (US); Staevan Duckworth, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/695,596

(22) Filed: Nov. 26, 2019

(51) Int. Cl.
 G06K 9/00 (2006.01)
 G06T 7/00 (2017.01)
 G06Q 30/06 (2012.01)
 G06F 3/048 (2013.01)

(52) U.S. Cl.
 CPC ............ G06T 7/0004 (2013.01); G06F 3/048 (2013.01); G06Q 30/0623 (2013.01); *G06T 2207/30248* (2013.01)

(58) Field of Classification Search
 CPC ......... G06T 7/0004; G06T 2207/30248; G06F 3/048; G06Q 30/0623
 USPC ........................................................ 382/141
 See application file for complete search history.

(56) References Cited

U.S. PATENT DOCUMENTS

| 8,286,102 | B1 | 10/2012 | Wilensky |
| 8,849,259 | B2 | 9/2014 | Rhoads et al. |
| 8,885,916 | B1 * | 11/2014 | Maurer ................ G06K 9/6202 382/141 |
| 9,785,245 | B2 | 10/2017 | Kimura et al. |
| 9,858,292 | B1 * | 1/2018 | Setlur ................... G06F 16/248 |
| 10,528,812 | B1 * | 1/2020 | Brouard .............. G06K 9/6256 |

(Continued)

FOREIGN PATENT DOCUMENTS

CN 103777852 B 10/2018

OTHER PUBLICATIONS

Gao, Yongbin, and Hyo Jong Lee. "Vehicle make recognition based on convolutional neural network." 2015 2nd International Conference on Information Science and Security (ICISS). IEEE, 2015. (Year: 2015).*

*Primary Examiner* — Andrew M Moyer
(74) *Attorney, Agent, or Firm* — Bookoff McAndrews, PLLC

(57) ABSTRACT

A computer-implemented method for processing images may include obtaining at least one image for analyzing; inputting the at least one image to at least one of a plurality of image plugins; analyzing the at least one image via the at least one of the plurality of image plugins; determining metadata related to the at least one image based on the at least one of the plurality of image plugins; filtering the at least one image based on one or more rule sets to generate at least one filtered image; sorting the at least one filtered image to generate at least one sorted image; displaying the at least one sorted image based on an organizational sequence of a webpage; displaying navigation controls via the webpage; and displaying the at least one sorted image according to a user interaction with the navigation controls on the webpage.

20 Claims, 7 Drawing Sheets

(56) References Cited

U.S. PATENT DOCUMENTS

2007/0185777 A1* 8/2007 Pyle .................. G06Q 30/02
  705/26.62
2016/0328397 A1* 11/2016 Tiuca .................. G06F 16/51

* cited by examiner

SYSTEMS AND METHODS FOR PROCESSING IMAGES BASED ON CRITERIA

TECHNICAL FIELD

Various embodiments of the present disclosure relate generally to processing images to determine metadata, and more specifically, to processing images of vehicles for vehicle related metadata.

BACKGROUND

Purchasers of relatively expensive items, such as cars, real estate, mattresses, boats, computers, etc. may conduct part or all of their shopping for such items online, via the Internet. In researching and completing such a purchase, a consumer may visit multiple websites in search of appropriate information. For example, consumers may view inventory information or perform other research regarding a purchase on multiple websites. However, different websites may vary both in the manner in which they present information and in the scope of the information presented. Thus, a user may be unable to find certain information on a particular website and/or may be unsure of where such information is located.

Furthermore, in areas of commerce such as those described above, purchasers may view inventory information via pictures merchants provide online. The disorganization of images presented online may be prohibitive for an individual consumer to obtain, analyze, and/or synthesize the information accurately. Thus, consumers may make sub-optimal purchase decisions due to a lack of accessible and/or digestible information.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for processing images for metadata. Each of the examples disclosed herein may include one or more of the features described in connection with any of the other disclosed examples.

In one example, a computer-implemented method for processing images may include obtaining, by one or more processors, at least one image for analyzing; inputting, by the one or more processors, the at least one image to at least one of a plurality of image plugins; analyzing, by the one or more processors, the at least one image via the at least one of the plurality of image plugins; determining, by the one or more processors, metadata related to the at least one image based on the at least one of the plurality of image plugins; filtering, by the one or more processors, the at least one image based on one or more rule sets to generate at least one filtered image; sorting, by the one or more processors, the at least one filtered image to generate at least one sorted image; displaying, by the one or more processors, the at least one sorted image based on an organizational sequence of a webpage; displaying, by the one or more processors, navigation controls via the webpage; and displaying, by the one or more processors, the at least one sorted image according to a user interaction with the navigation controls on the webpage.

According to another aspect of the disclosure, a computer system for processing images may include a memory having processor-readable instructions stored therein; and at least one processor configured to access the memory and execute the processor-readable instructions to perform a plurality of functions. The functions may include obtaining at least one image; analyzing the at least one image via at least one of a plurality of image plugins; determining metadata related to the at least one image based on the analyzing the at least one image; filtering the at least one image based on a predetermined metadata to generate at least one filtered image; sorting the at least one filtered image to generate at least one sorted image; displaying the at least one sorted image based on an organizational sequence of a webpage; displaying navigation controls on the webpage; and displaying the at least one sorted image according to a user interaction with the navigation controls on the webpage.

In another aspect of the disclosure, a computer-implemented method for processing images may include training, by one or more processors, at least one of a plurality of image plugins by analyzing pre-labeled images to determine metadata related to the pre-labeled images; comparing, by the one or more processors, the metadata determined by the at least one of the plurality of image plugins to the pre-labeled images; obtaining, by the one or more processors, at least one image; analyzing, by the one or more processors, the at least one image via the at least one of the plurality of image plugins; determining, by the one or more processors, metadata related to the at least one image via the at least one of the plurality of image plugins; filtering, by the one or more processors, the at least one image based on one or more predetermined metadata to generate at least one filtered image; sorting, by the one or more processors, the at least one filtered image to generate at least one sorted image; displaying, by the one or more processors, the at least one sorted image based on an organizational sequence of a webpage; displaying, by the one or more processors, navigation controls on the webpage; and displaying, by the one or more processors, the at least one sorted image according to a user interaction with the navigation controls on the webpage.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
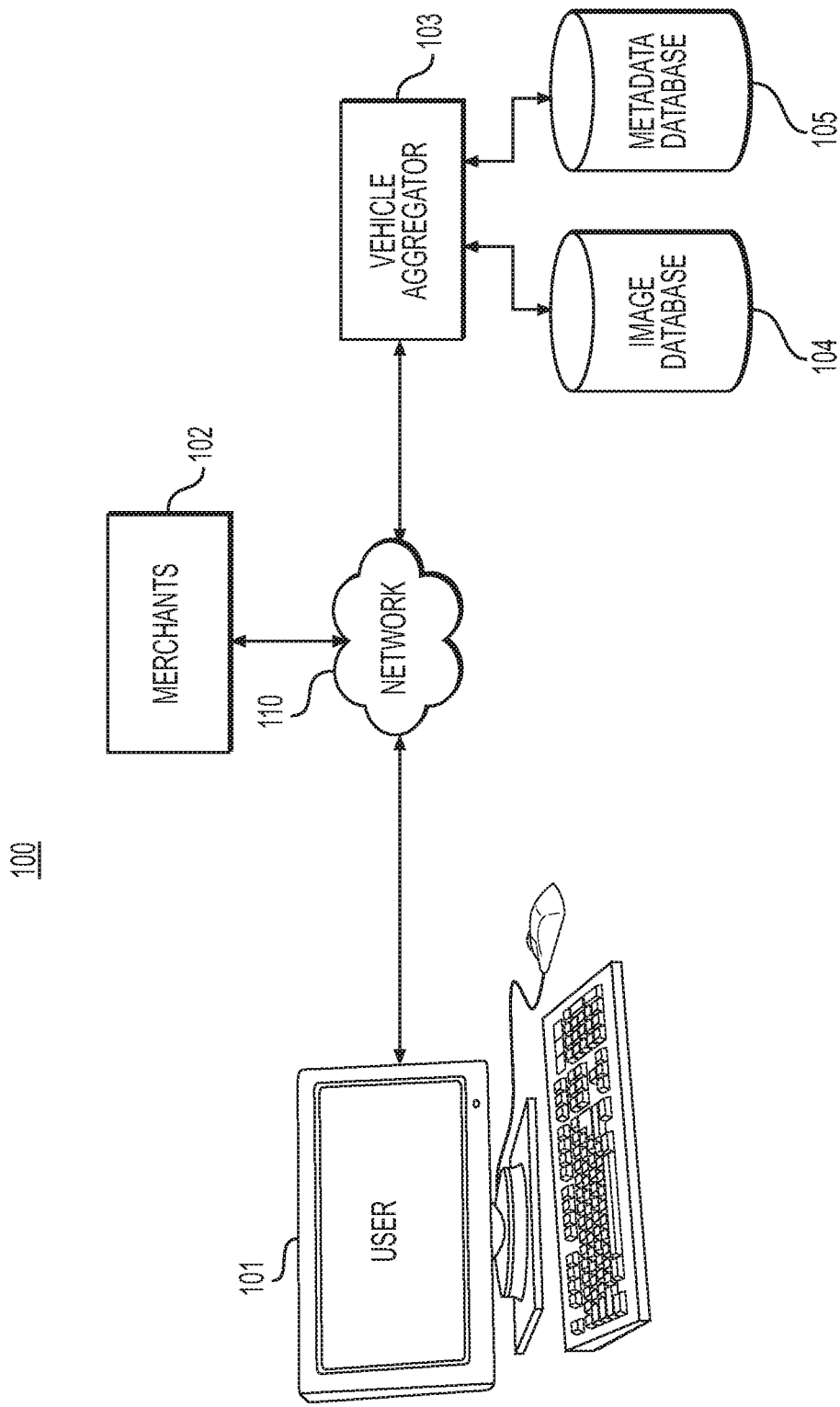
FIG. 1 depicts an exemplary environment in which systems, methods, and other aspects of the present disclosure may be implemented.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompany drawings. Various embodiments of the present disclosure relate generally to methods and systems for processing images of vehicles for metadata. For example, various embodiments of the present disclosure relate to determining the metadata of each of a plurality of images of vehicles. In some arrangements, the plurality of images of vehicles may be presented online at a vehicle aggregator service provider for purchasers to browse and research for potential purchases.

In order for a vehicle aggregator service provider to display images of vehicles, the service provider may need to know information pertaining to the subject of each image. Vehicle aggregator service providers receive large quantities of images from independent vehicle dealers, each of whom may transmit images without any detectable or attempted uniformity. For example, vehicle dealers may transmit images of place holder vehicles (e.g., dealership logo images, etc.), generic stock images, or images without any identifiable information pertinent to a specified product. If the vehicle aggregator service provider does not know what is being presented within each of the images, then the service provider may provide incorrect information, may provide insufficient information, and/or may cause a negative experience for a user researching for vehicles. Furthermore, it may be desirable for the service provider to know what is being presented within each of the images (e.g., image of an interior of the vehicle, image of an exterior of the vehicle, image of a vehicle's insignia) so that the images may be presented by the vehicle aggregator service provider in a uniform manner for branding purposes, site organization/planning purposes, efficiency purposes, and/or to induce positive user interaction with the vehicle aggregator service provider.

Therefore, a need exists to process images supplied by independent vehicle dealers so that the vehicle aggregator service provider may present the images in an orderly and consistent manner, remove unnecessary or useless images, or identify key features within an image for labeling.

Referring now to the appended drawings, FIG. 1 shows an exemplary environment 100 in which the processing of merchant-supplied vehicle images may be implemented. Environment 100 may include a user device 101 associated with, or operated by, a user, one or more merchants 102, vehicle aggregator service provider 103, image database 104 and metadata database 105. Various components of environment 100 may be in communication with each other via network 110 (e.g., the Internet). For example, the user device 101 may communicate with the vehicle aggregator 103 via network 110, and the merchants 102 may communicate with the vehicle aggregator 103 via network 110. The network 110 may be any suitable network or combination of networks and may support any appropriate protocol suitable for communication of data between various components in the system environment 100. The network may include a public network (e.g., the Internet), a private network (e.g., a network within an organization or intranet), or a combination of public and/or private networks.

The user device 101 may be operated by one or more users to perform browsing, research, purchases, and/or transactions at an online environment. Examples of user device 101 may include smartphones, wearable computing devices, tablet computers, laptops, desktop computers, and on-board vehicle computer systems.

Each merchant 102 may be an entity that provides products. In this disclosure, the term "product," in the context of products offered by a merchant, encompasses both goods and services, as well as products that are a combination of goods and services. A merchant may be, for example, vehicle dealer, vehicle reseller, vehicle manufacture, and/or other type of entity that provides products that a user may purchase.

The vehicle aggregator service provider 103 may be an entity that receives images of vehicles for sale from the merchant 102 and hosts the images on a website for users to browse and research for available vehicles. In some examples, vehicle aggregator service provider 103 may include one or more merchant service providers that provide merchants 102 with the ability to process financial loans, such as vehicle loans.

Image database 104 may include images of vehicles supplied by merchants 102. The images of vehicles may be for vehicles that are available for sale by the merchant 102. Each available vehicle may have a plurality of pictures documenting the features of the vehicle. For example, images may include the outside of the vehicle, the interior of the vehicle, special features and options, etc. Each image may also have an associated identification number stored in the database. Metadata database 105 may include metadata associated with each of the images of vehicles stored in the image database 104. Metadata stored in metadata database 105 may include features or information identified from each image by the image processing process. For example metadata may include the make, model, color, features/options, and various other information identifiable from, or embedded within, the images. The image processing process and metadata will be explained in further detail, below. It is understood that each of image database 104 and metadata database 105 may include a plurality of databases in communication with one another, and/or image database 104 and metadata database 105 may be combined into a single (e.g., only one) database.

Environment 100 may include one or more computer systems configured to gather, process, transmit, and/or receive data. In general, whenever environment 100 is described as performing an operation of gathering, processing, transmitting, or receiving data, it is understood that such operation may be performed by a computer system thereof. In general, a computer system may include one or more computing devices, as described in connection with FIG. 7 below.

Figure 2:
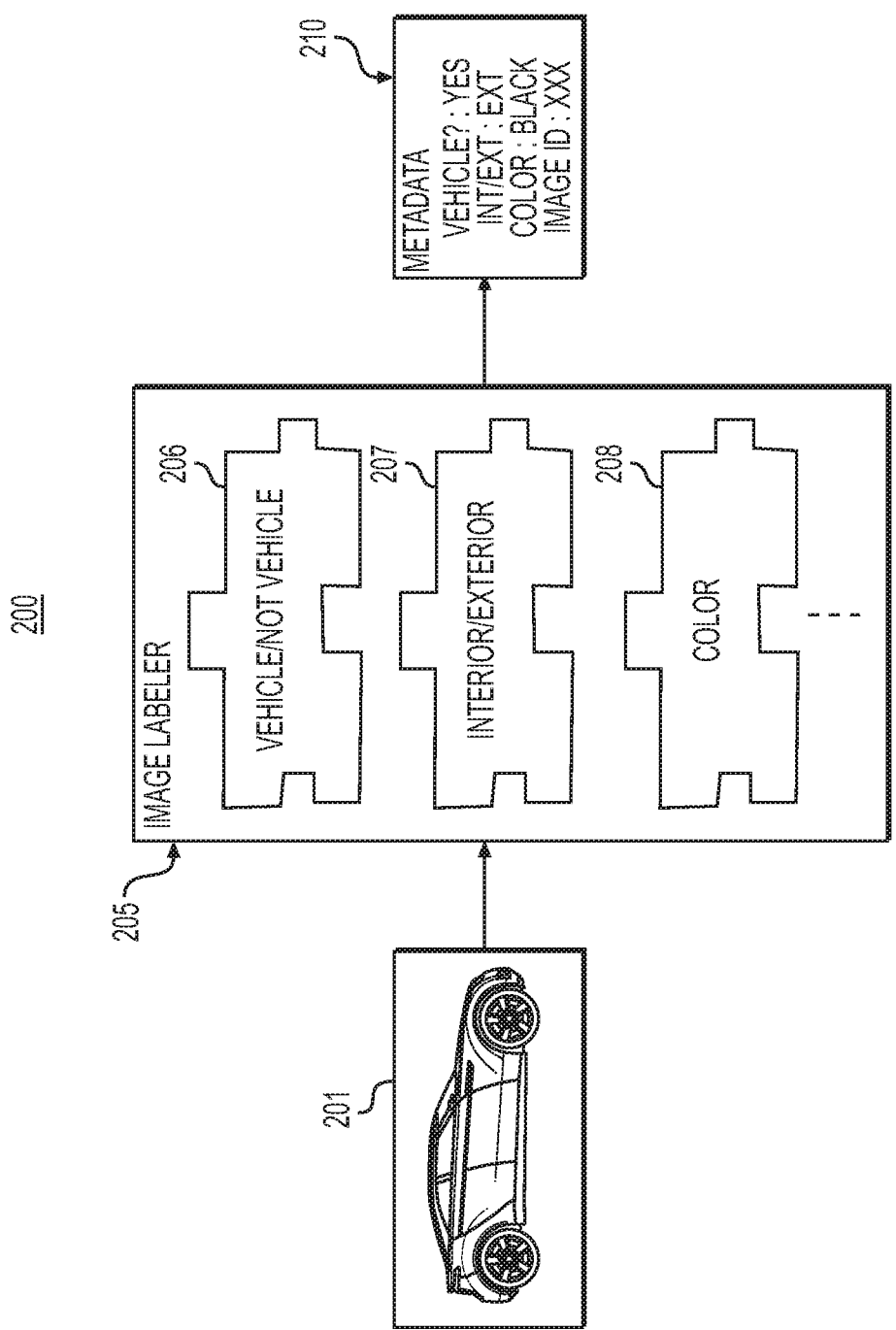
FIG. 2 depicts an exemplary block diagram of an image metadata determining process, according to one aspect of the present disclosure.

FIG. 2 depicts an exemplary block diagram 200 of an image metadata determining process, according to one aspect of the present disclosure. Diagram 200 may include images 201, image labeler 205, and labeled metadata 210. Image labeler 205 may include a plurality of image plugins. One plugin may be created to identify a singular object in the images, or one plugin may be created to identify a plurality of objects in the images. For example, as illustrated in FIG. 2, labeler 205 may include plugin 206 that may identify if a vehicle is present in the picture, plugin 207 that may identify if the image is of the exterior of the vehicle or interior of the vehicle, and plugin 208 may identify the color of the vehicle in the image. Other plugins, while not illustrated in diagram 200, may also be included. For example a plugin may be created to identify the make of the vehicle in the image, one plugin may be created to identify the model of the vehicle in the image, one plugin may be created to identify the angle of the vehicle in the image (for example, front of the vehicle, side profile of the vehicle, quarter profile of the vehicle, rear of the vehicle), one plugin may be created to identify the year of the vehicle in the image, and one plugin may be created to identify the quality of the image (for example, low or high resolution image). Other plugins may also be created to identify any features that may be available in a vehicle.

The plugins may be created using machine learning processes that takes an image as an input and process the image to identify objects that may be present in the image. Plugins may use any object detection model or image recognition model or any appropriate computer vision approach to process the images. Each of the plugins may be trained using pre-labeled images either already present in image database 104 or metadata database 105, or supplied by third parties. Training of the plugins may be performed as follows: (1) the plugin may retrieve a pre-labeled image, for example an image of a black vehicle labeled "black vehicle", and (2) via machine learning, the plugin may process the pre-labeled image so as to learn to identify black vehicles in an image. Each plugin may be trained using a specific pre-labeled image (or a specific plurality of pre-labeled images). The plugins, once generated, may be continuously trained via images supplied by the merchants 102.

As illustrated in FIG. 2, image labeler 205 may be made up of a plurality of plugins, each plugin may be removed from labeler 205, or new plugins may be added to labeler 205 at any point convenient to the vehicle aggregator 103. As such, labeler 205 may be deployed to process images as soon as plugins are introduced and created without delaying to wait for all plugins to be created. As new plugins are introduced and created they may be added to the labeler 205 without affecting the operation of the labeler 205. In the example depicted in FIG. 2, the labeler 205 may process each image sequentially through each of the plurality of plugins. For example, image 201 may be retrieved and fed into labeler 205 for metadata processing. The image 201 may proceed to the plugin 206 to identify if a vehicle is present in the image. After processing at plugin 206, the image 201 may be transmitted to plugin 207 to identify whether the image 201 illustrates an exterior or an interior of a vehicle. After processing at plugin 207, the image 201 may be transmitted to plugin 208 to identify a color of the vehicle present in the image 201. After the image is processed by all the plugins of labeler 205, labeled metadata 210 may be generated for the image. The labeled metadata 210 may include information (e.g., labels) determined from the image 201 by the plugins (e.g., plugins 206-208). For example, labeled metadata 210 generated for image 201 may indicate that the exterior of a black vehicle is present in the image 201. Labeled metadata 210 may also indicate the image ID for image 201 for associating image 201 with labeled metadata 210. Labeled metadata 210, once determined, may be stored in the metadata database 105.

In another embodiment, each of the plugins within the labeler 205 may be located in a distributed fashion and each of the plugins may process the same image in parallel. For example, image 201 may be retrieved and fed into plugin 206, plugin 207, and plugin 208 at the same time or substantially similar time for processing. Each plugin may then perform processing and identify the object of the image 201. Once the image 201 has been processed by the plugins (e.g., plugins 206-208), the determined information may be used to generate labeled metadata 210. Labeled metadata 210 may then be stored in the metadata database 105.

Figure 3:
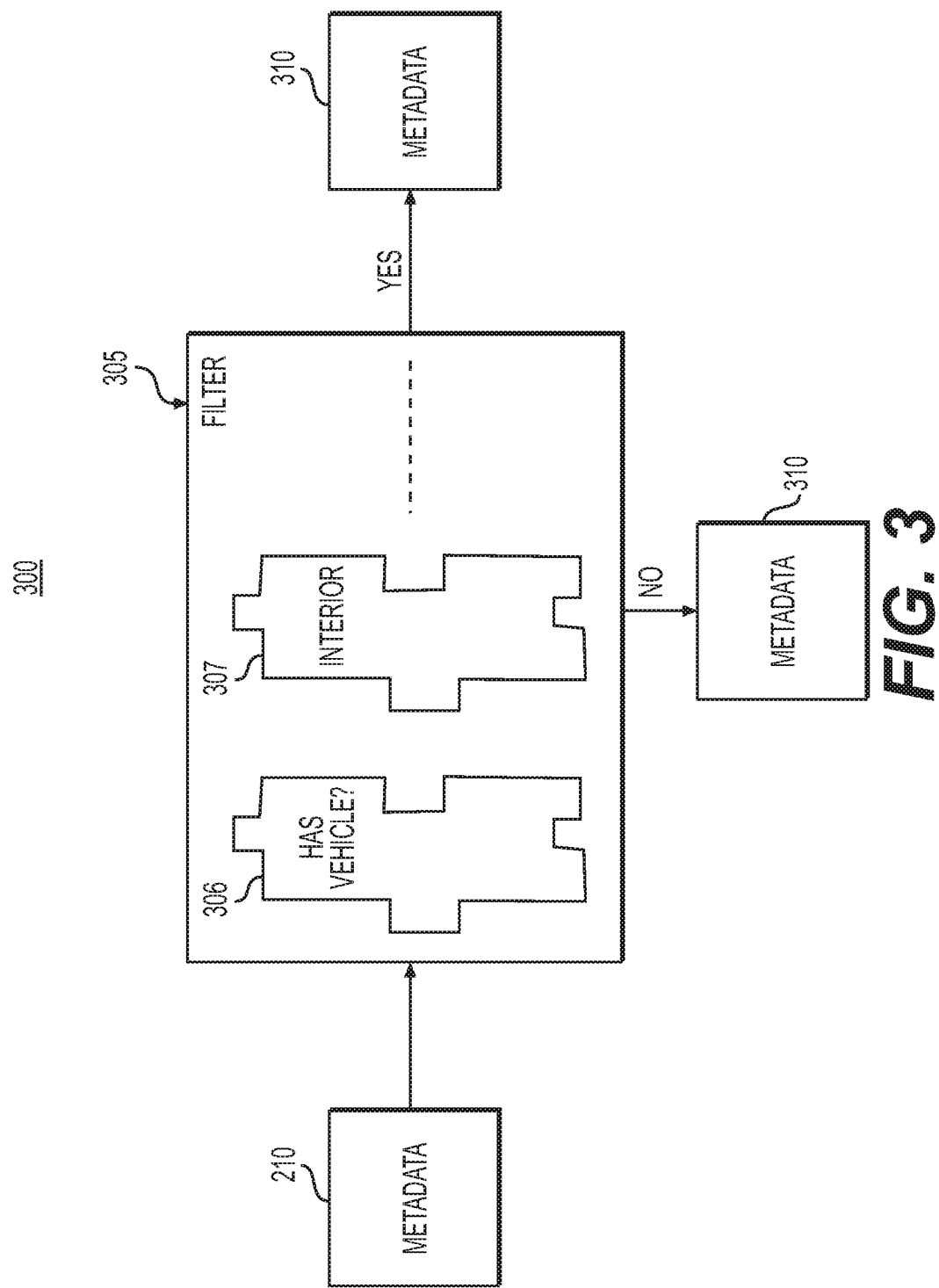
FIG. 3 depicts an exemplary block diagram of an image metadata filtering process, according to one aspect of the present disclosure.

FIG. 3 depicts an exemplary block diagram 300 of an image metadata filtering process, according to one aspect of the present disclosure. Diagram 300 may include metadata filter 305 for filtering labeled metadata 210 into filtered metadata 310. Metadata filter 305 may include a plurality of components. One such component may be generated to filter a singular data element of labeled metadata 210, or one component may be created to filter a plurality of data elements of metadata 210. For example, as illustrated in FIG. 3, filter 305 may include component 306 that may filter labeled metadata 210 by identifying whether the image is labeled as having a vehicle present in the image. Additionally, filter 305 may include component 307 that may filter labeled metadata 210 by identifying whether the image is labeled as showing the interior of the vehicle. Other components, while not illustrated in diagram 300, may also be included. By way of non-limiting example, a component may be generated to filter labeled metadata 210 based on (1) the identification of the make of the vehicle in the image, (2) the identification of the model of the vehicle in the image, (3) the identification of the angle of the vehicle in the image (for example, front of the vehicle, side profile of the vehicle, quarter profile of the vehicle, rear of the vehicle, etc.), (4) the identification of the year of the vehicle in the image, and/or (5) the identification of the quality of the image (for example, low or high resolution image). Other components may also be created to filter labeled metadata 210 based on the identification of any other labeled feature of the vehicle without departing from the scope of the present application.

As illustrated in exemplary FIG. 3, metadata filter 305 may include a plurality of components. Each such component may be updated or removed from filter 305, or a new component may be added to filter 305 at any point convenient to the vehicle aggregator 103. As such, the filter 305 may be deployed to process metadata as soon as components are introduced without delaying to wait for all components to be created. As new components are introduced and created they may be added to the filter 305 without affecting the operation of the filter 305. In the example depicted in FIG. 3, the filter 305 may filter each labeled metadata 210 sequentially through each of the plurality of components. For example, labeled metadata 210 may be retrieved and fed into filter 305 for metadata filtering. The labeled metadata 210 may proceed to the component 306 to identify if the labeled metadata 210 indicates a vehicle is present in the image. After processing at component 306, the labeled metadata 210 may be transmitted to component 307 to identify if the labeled metadata 210 indicates that the interior of the vehicle is present in the image. In some arrangements, labeled metadata 210 need not be filtered by all components of filter 305. For example, if component 306 determined that the image does not contain a vehicle, then there may be no need to further process the labeled metadata 210 via component 307. Accordingly, in some arrangements, labeled metadata 210 may be processed sequentially by each applicable component of labeler, which may be less than all of the components of filter 305. After the labeled metadata 210 is filtered by all the components of filter 305 (or all of the applicable components of filter 305), the filtered metadata 310 may be output by filter 305. Filtered metadata 310 may be stored in the metadata database 105. Metadata database 105 may be configured to store filtered metadata 310 based on the results of the filtering process. For example, the metadata database 105 may store all of the filtered metadata 310 of images with no vehicles present together, and store all of the filtered metadata 310 of images with vehicles present together. Likewise the metadata database 105 may store all of the filtered metadata 310 of images with no vehicle interiors shown together, and store all of the filtered metadata 310 of images with vehicle interiors shown together. In another embodiment, all of the filtered metadata 310 may include a data field that indicates the results of the different filtering components of filter 305 and may be stored together in the database 105.

In another embodiment, each of the components of filter 305 may be located in a distributed fashion and each of the components may filter the labeled metadata 210 in parallel. For example, labeled metadata 210 may be retrieved and fed into component 306 and component 307 at the same time or substantially similar time for filtering via filter 305. Each component may then filter the labeled metadata 210 into filtered metadata 310 Filtered metadata 310 may then be stored in the metadata database 105, as noted above.

Figure 4:
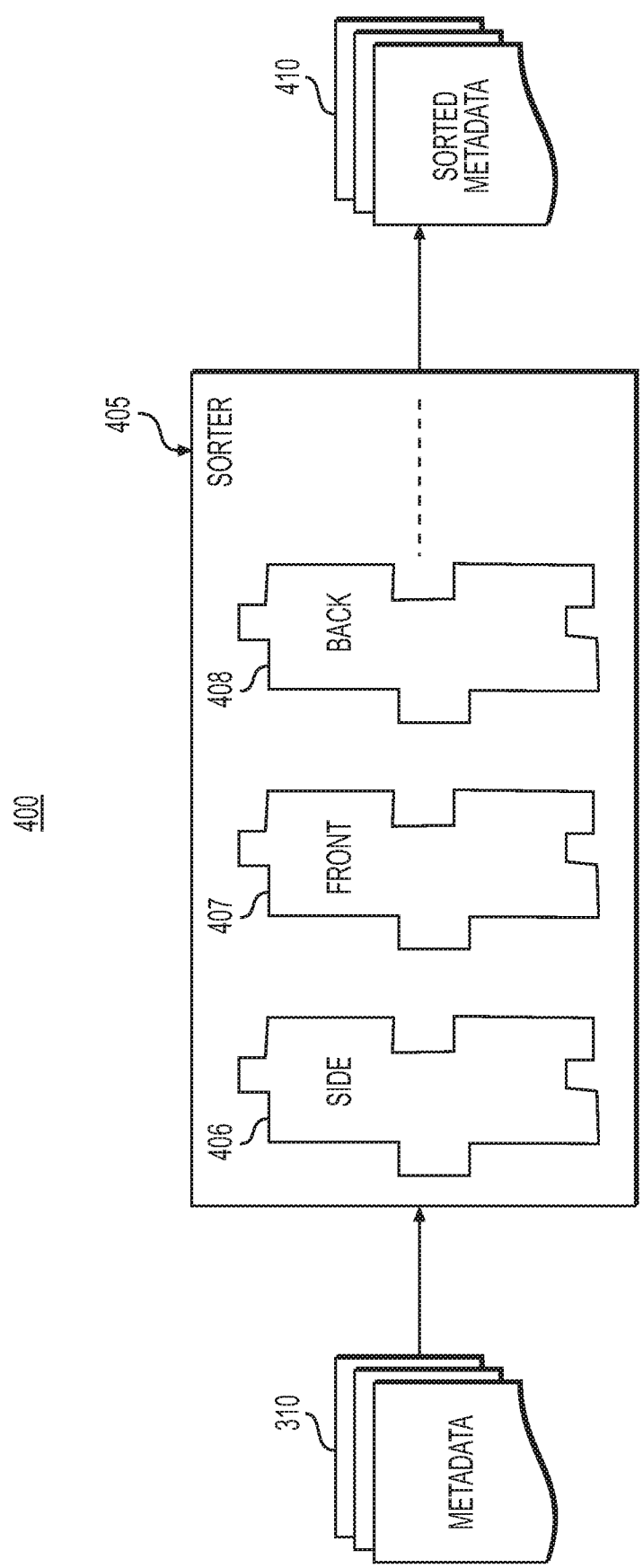
FIG. 4 depicts an exemplary block diagram of an image metadata sorting process, according to one aspect of the present disclosure.

FIG. 4 depicts an exemplary block diagram 400 of an image metadata sorting process, according to one aspect of the present disclosure. Diagram 400 may include a metadata sorter 405 for sorting filtered metadata 310 into sorted metadata 410. Metadata sorter 405 may include a plurality of sorter components, for example, components 406, 407, and 408 configured to sort the filtered metadata 310 based on whether the image of the vehicle is a side-view of the vehicle, a front-view of the vehicle, or a back-view of the vehicle, respectively. Other sorter components, while not illustrated in diagram 400, may also be included. For example, a component may be generated to sort filtered metadata 310 based on (1) the identification of the make of the vehicle in the image, (2) the identification of the model of the vehicle in the image, and/or (3) the identification of other angles of the vehicle in the image (for example, quarter profile of the vehicle, top-view of the vehicle, etc.). Other components may also be created to sort filtered metadata 310 based on the identification of any other labeled feature of the vehicle without departing from the scope of the present application.

Metadata sorter 405 may be configured to sort the filtered metadata 310 based on the order (e.g., the "sorting sequence") of the sorter components in sorter 405 (e.g., components 406, 407, and 408 discussed above). As such, filtered metadata 310 may be retrieved from metadata database 105, and processed by the sorter 405. After processing, the images of the vehicle may be sorted such that images of the side of the vehicle will appear first, followed by images of the front of the vehicle, and then followed by images of the back of the vehicle. The sorted images may then be stored in the image database 104 in the order of sorting sequence and/or may be output on a user interface of the user device 101 in the order of the sorting sequence. The user interface may be an internet browser or may be an application executed on the user device 101.

As illustrated in exemplary FIG. 4, metadata sorter 405 may be made up of a plurality of components. Each component may be removed from sorter 405, or new component may be added to sorter 405 at any point convenient to the vehicle aggregator 103. As such, sorter 405 may be deployed to sort metadata as soon as components are introduced without delaying to wait for all components to be created. As new components are introduced and created they may be added to the sorter 405 without affecting the operations of the sorter 405.

Figure 5:
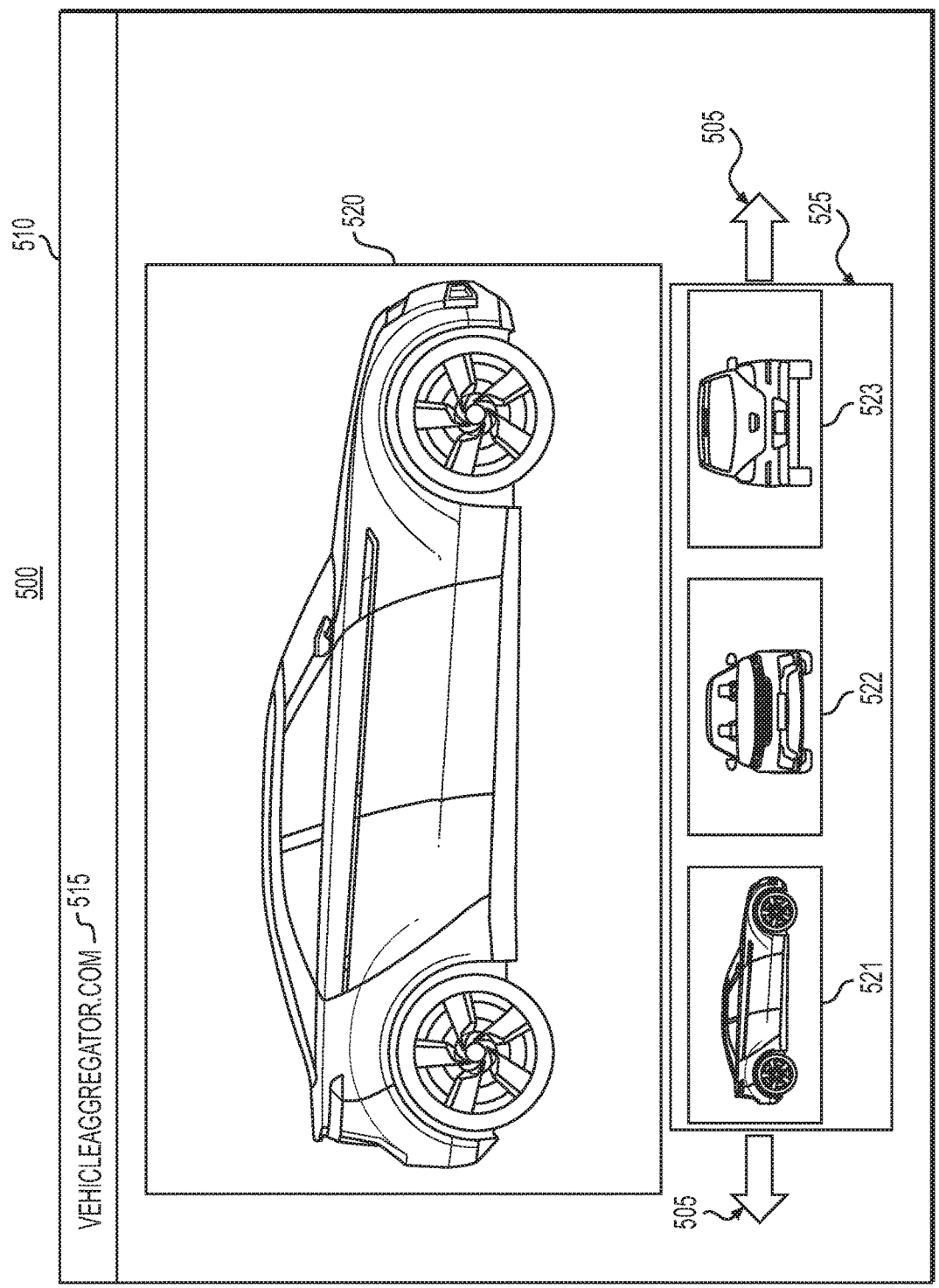
FIG. 5 depicts an exemplary user interface of a user device, according to one aspect of the present disclosure.

FIG. 5 depicts an exemplary user interface 500 of the user device 101, according to one aspect of the present disclosure. The user interface 500 may be an internet browser or may be an application executed on the user device 101. User interface 500 may be configured to display the sorted images of vehicles to a user and may include the browser/application 510, service provider identification area 515, main image display area 520, secondary image display area 525, and navigation controls 505. As depicted in user interface 500, the images of the vehicle are sorted in the order represented by FIG. 4 (e.g., the sorting sequence). For example, the images of the vehicle are arranged in the following order: a side-view image 521 of the vehicle is displayed first, followed by a front-view image 522 of the vehicle, and then followed by a back-view image of the vehicle 523. The user may use the navigation controls 505 (e.g., forward and backward arrows) to navigate between the images displayed in the secondary image display area 525, or the user may directly interact with a specific image within the secondary image display area 525 (e.g., via a mouse or touch interaction). Once an image is selected by the user using either the navigation controls 505 or direct interaction, then the image may be displayed in the main image display area 520. The main image display area 520 may display the image at a larger size compared to the images in the secondary image display area 525. The images in the secondary image display area 525 may be, for example, thumbnail images of the respective vehicle.

Figure 6:
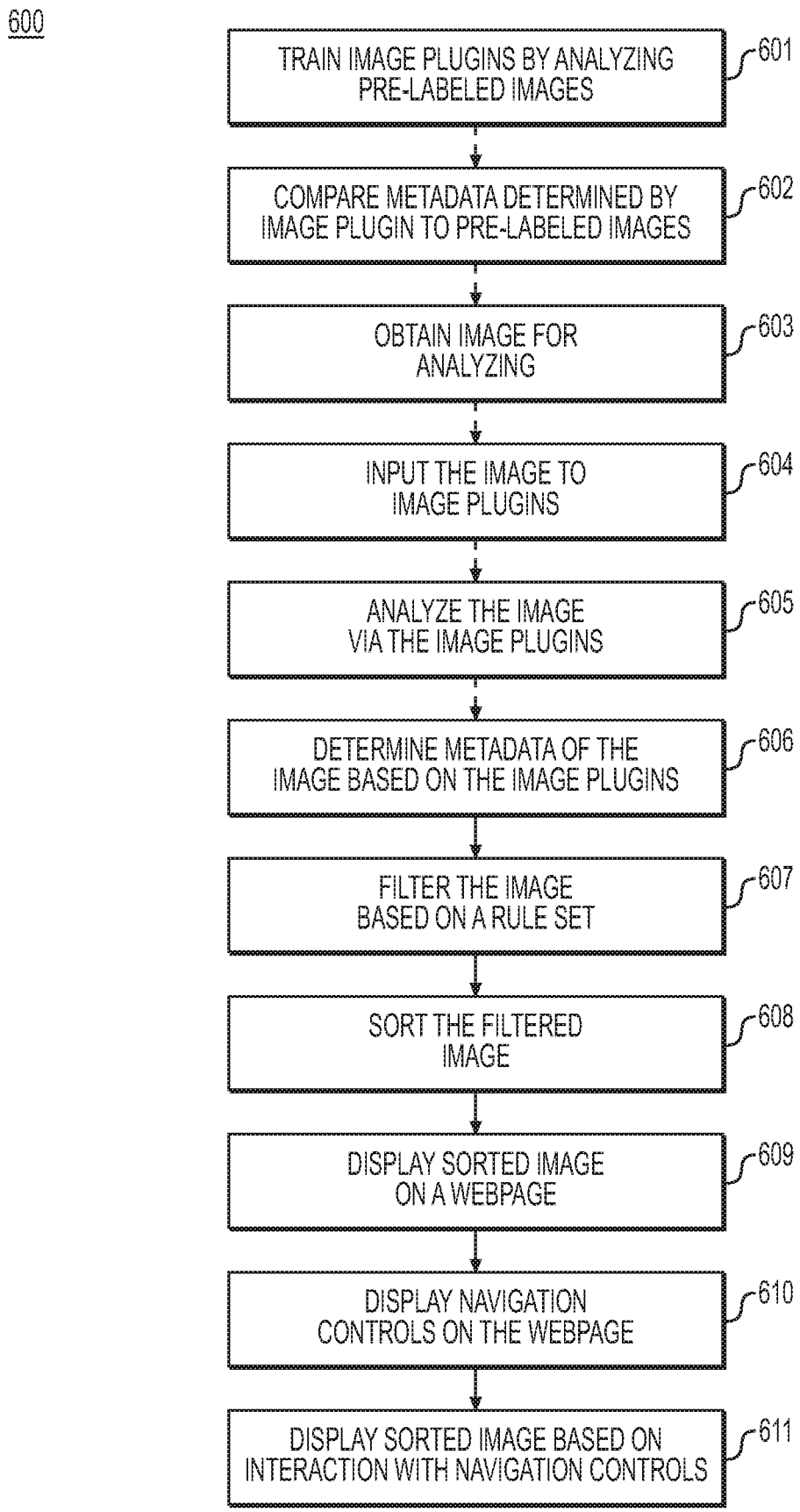
FIG. 6 depicts an exemplary flow diagram of a method for image processing, according to aspects of the present disclosure.

FIG. 6 depicts an exemplary flow diagram of a method 600 for image processing, according to aspects of the present disclosure. Method 600 may begin at step 601 where the vehicle aggregator service provider 103 may train image plugins to analyze pre-labeled images. The pre-labeled images, as discussed above, may contain previously determined (e.g., known) metadata. At step 602, a comparison may be performed of the metadata determined by the image plugins to the known metadata of the pre-labeled images to fix any errors and complete the training process. Upon the completion of plugin training at step 602, at step 603 new images of vehicles may be obtained to analyze for metadata. The images of vehicles may be retrieved from the image database 104. Upon obtaining vehicle images at step 603, the images may be input into the trained image plugins at step 604. Upon receiving the vehicle images, the image plugins may analyze the vehicle images at step 605 to identify metadata associated with the images. At step 606 the metadata associated with each of the vehicle images may be determined. The metadata may be related to the subject vehicle, for example, vehicle make, vehicle model, vehicle year, vehicle color, vehicle picture angle, vehicle options, etc. The metadata may also be related to the image file, such as image file size, image resolution, image location, image file type, etc. It is understood, that step 606 may be performed in a manner similar to that as described above in connection with FIG. 2. For example, determining the metadata associated with the vehicle images may include inputting the images into an image labeler 205, and analyzing the images via components 206, 207, 208, etc., to generate labeled metadata 210.

Upon the determination of metadata related to the vehicle images at step 606, the images may then be filtered at step 607 based on a rule set. The rule set may be determined by the vehicle aggregator service provider 103, or any other appropriate party. The rule set may comprise metadata determined from the vehicle images. For example, images without any vehicles may be filtered out, or images below a certain size or resolution may be filtered out. Images that are filtered out may be deleted from the image database 104, or may be stored in the image database 104 with an indication of the result of the filtering process. It is understood, that images may be filtered in a manner similar to that as described above in connection with FIG. 3. For example, the labeled metadata 210 of the images may be input into filter 305, and filtered via one or more components 306, 307, etc., of filter 305 to generate filtered metadata 310 associated with the images. In such a way, the one or more components 306, 307, etc. of filter 305 may define at least a portion of the rule set. Upon the completion of the filtering step 607, the filtered images may then be sorted at step 608. For example, the filtered images may be sorted in a manner similar to that as described above in connection with FIG. 4. That is, the filtered metadata 310 of the images may be input into a sorter 405, and sorted via one or more components 406, 407, 408, etc. of sorter 405 to generate sorted metadata 410 associated with the images. The sorting sequence may be based on the same rule set (e.g. the order of the components) as the filter rule set in step 607, or the sorting sequence may be based on a different rule set. The sorting step 608 may sort the images based on the same order as the components 406, 407, 408, etc. For example, the sorting rule set may sort the images in the following order: image of the side of the vehicle first, then image of the front of the vehicle, followed by image of the rear of the vehicle. Upon the completion of the sorting step 608, the sorted images may be displayed on a webpage at step 609. At step 610, navigation controls to navigate through the sorted images may be displayed on the webpage. The navigation controls (e.g., navigation controls 505 of FIG. 5) may be displayed next to the images on the webpage (e.g., next to secondary image display area of FIG. 5), or the navigation controls may be displayed as an overlay on top of the images. At step 611, a user operating the user device 101 may use the navigation controls to view the sorted image displayed on the webpage.

Figure 7:
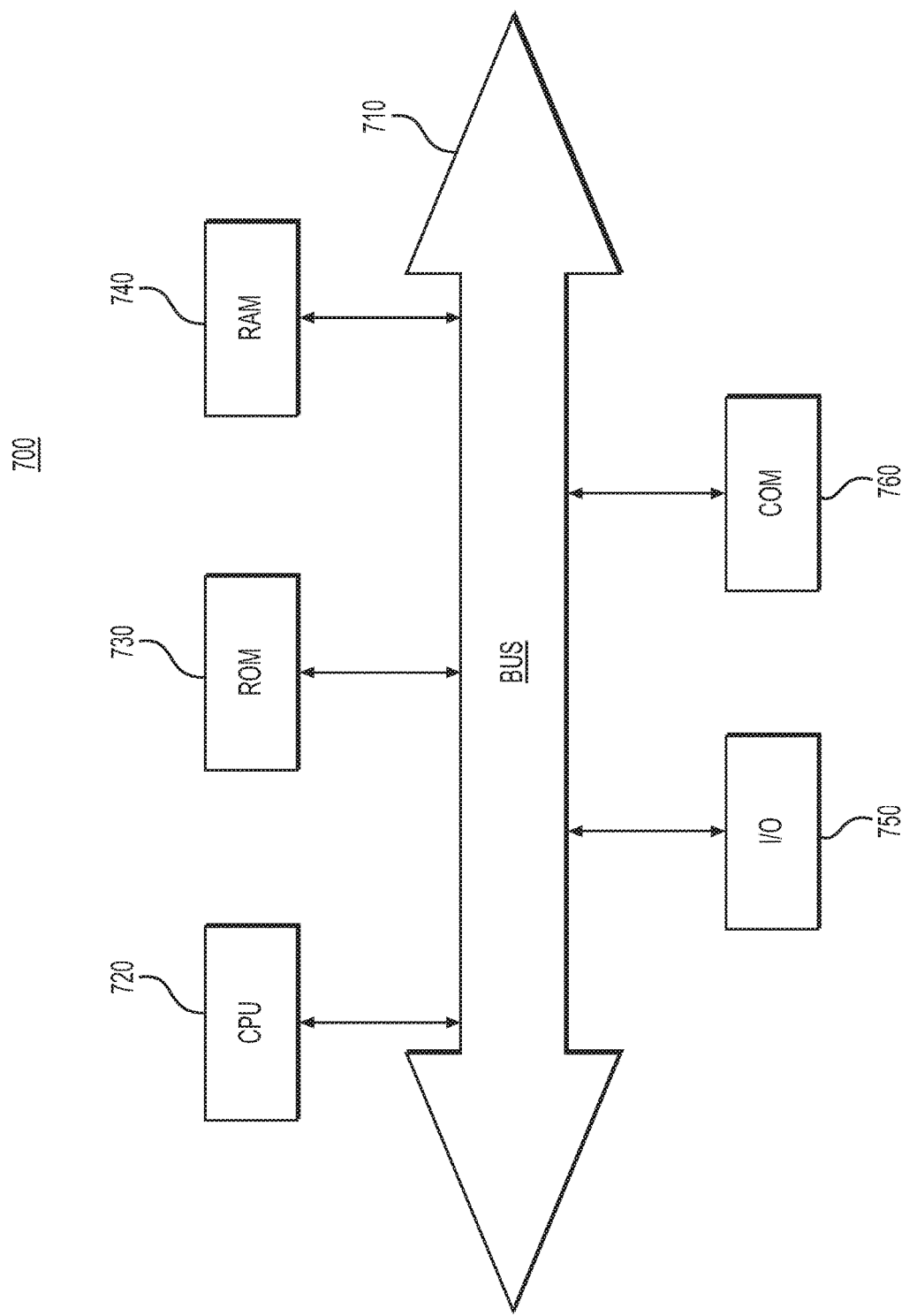
FIG. 7 depicts an exemplary computer device or system, in which embodiments of the present disclosure, or portions thereof, may be implemented.

FIG. 7 depicts a high-level functional block diagram of an exemplary computer device or system, in which embodiments of the present disclosure, or portions thereof, may be implemented, e.g., as computer-readable code. In some implementations, the user device 101 may correspond to device 700. Additionally, each of the exemplary computer servers, databases, user interfaces, modules, and methods described above with respect to FIGS. 1-6 can be implemented via device 700 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-6.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-6, may be implemented using device 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 7, device 700 may include a central processing unit (CPU) 720. CPU 720 may be any type of processor device including, for example, any type of special purpose or a general-purpose microprocessor device. As will be appreciated by persons skilled in the relevant art, CPU 720 also may be a single processor in a multi-core/multi-processor system, such system operating alone, or in a cluster of computing devices operating in a cluster or server farm. CPU 720 may be connected to a data communication infrastructure 710, for example, a bus, message queue, network, or multi-core message-passing scheme.

Device 700 also may include a main memory 740, for example, random access memory (RAM), and also may include a secondary memory 730. Secondary memory 730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into device 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 700.

Device 700 also may include a communications interface ("COM") 760. Communications interface 760 allows software and data to be transferred between device 700 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of device 700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for processing images, the method comprising:
   obtaining, by one or more processors, at least one image for analyzing, wherein the at least one image depicts at least one object;
   storing, by the one or more processors, the at least one image in a queue of images;
   inputting, by the one or more processors, the at least one image to at least one of a plurality of image plugins;
   analyzing, by the one or more processors, the at least one image concurrently via each of at least two of the plurality of image plugins, wherein the at least two of the plurality of image plugins are configured to identify one or more different aspects of the same at least one object depicted in the at least one image;

determining, by the one or more processors, metadata related to the at least one image based on the at least two of the plurality of image plugins;

associating the metadata related to the at least one image with an image ID corresponding to the at least one image;

filtering, by the one or more processors, the at least one image based on one or more rule sets to generate at least one filtered image;

sorting, by the one or more processors, the at least one filtered image to generate at least one sorted image;

displaying, by the one or more processors, the at least one sorted image based on an organizational sequence of a webpage;

displaying, by the one or more processors, navigation controls via the webpage; and displaying, by the one or more processors, the at least one sorted image according to a user interaction with the navigation controls on the webpage.

2. The computer-implemented method of claim 1, wherein the plurality of image plugins are arranged in distributed locations and the method further includes:

analyzing the at least one image in parallel via the plurality of image plugins.

3. The computer-implemented method of claim 1, wherein at least two or more images are stored in the queue of images and wherein the plurality of image plugins are arranged in a centralized location, the method further including:

analyzing, in parallel, the at least two or more images stored in the queue of images via the at least two of the plurality of image plugins.

4. The computer-implemented method of claim 3, the method further including:

analyzing the at least one image via the at least two of the plurality of image plugins; and after the analyzing the at least one image via each of the at least two image plugins, removing the at least one image from the queue of images.

5. The computer-implemented method of claim 1, wherein the metadata includes at least one of vehicle present indication, vehicle interior, vehicle exterior, vehicle degree of rotation, vehicle interior color, vehicle exterior color, vehicle options, vehicle make, vehicle model, vehicle year, image quality, image size, or vehicle wheel size.

6. The computer-implemented method of claim 1, further including:

receiving the at least one image from one or more merchants.

7. The computer-implemented method of claim 1, where the one or more rule sets includes the metadata related to the at least one image.

8. The computer-implemented method of claim 1, wherein analyzing the at least one image via the at least two of the plurality of image plugins utilizes at least one object detection model or image recognition model.

9. The method of claim 1, wherein the displaying, by the one or more processors, the at least one sorted image according to the user interaction with the navigation controls on the webpage further comprises:

displaying the at least one object in a first display area; and displaying two or more thumbnail images in a second image display area, wherein each of the two or more thumbnail images depicts the one or more different aspects of the same at least one object.

10. The method of claim 9, wherein the at least one object is a vehicle, and the one or more different aspects of the same at least one object correspond to a side view, front view, or rear view of the vehicle, the method further comprising:

replacing, by the one or more processors, based on a user selection, the at least one object in the first display area with an enlarged image of one of the two or more thumbnail images.

11. A computer system for processing images, the computer system comprising:

a memory having processor-readable instructions stored therein; and at least one processor configured to access the memory and execute the processor-readable instructions, which when executed by the at least one processor configures the at least one processor to perform a plurality of functions, including functions for:

obtaining at least one image, wherein the at least one image depicts at least one object;

storing the at least one image in a queue of images;

analyzing the at least one image concurrently via each of at least two of a plurality of image plugins, wherein the at least two of the plurality of image plugins are configured to identify one or more different aspects of the same object depicted in the at least one image;

determining metadata related to the at least one image based on the analyzing the at least one image;

associating the metadata related to the at least one image with an image ID corresponding to the at least one image;

filtering the at least one image based on a predetermined metadata to generate at least one filtered image;

sorting the at least one filtered image to generate at least one sorted image;

displaying the at least one sorted image based on an organizational sequence of a webpage;

displaying navigation controls on the webpage; and displaying the at least one sorted image according to a user interaction with the navigation controls on the webpage.

12. The computer system of claim 11, wherein the plurality of image plugins are arranged in distributed locations.

13. The computer system of claim 11, wherein the plurality of image plugins are arranged in a centralized location.

14. The computer system of claim 13, wherein the functions further include analyzing the at least one image via each of the at least two image plugins, and after the analyzing the at least one image via each of the at least two image plugins, removing the at least one image from the queue of images.

15. The computer system of claim 11, wherein the metadata includes at least one of vehicle present indication, vehicle interior, vehicle exterior, vehicle degree of rotation, vehicle interior color, vehicle exterior color, vehicle options, vehicle make, vehicle model, vehicle year, image quality, image size, or vehicle wheel size.

16. The computer system of claim 11, wherein the functions further include receiving the at least one image from one or more merchants.

17. The computer system of claim 11, wherein analyzing the at least one image via the at least two of the plurality of image plugins utilizes at least one object detection model or image recognition model.

18. The system of claim 11, wherein the displaying, by the one or more processors, the at least one sorted image according to the user interaction with the navigation controls on the webpage further comprises:
   displaying an object in a first display area; and
   displaying two or more thumbnail images in a second image display area, wherein each of the two or more thumbnail images depicts the one or more different aspects of the same object.

19. The system of claim 18, wherein the at least one object is a vehicle, and the one or more different aspects of the same at least one object correspond to a side view, front view, or rear view of the vehicle, and wherein the functions further include:
   replacing, based on a user selection, the at least one object in the first display area with an enlarged image of one of the two or more thumbnail images.

20. A computer-implemented method for processing images, the method comprising:
   training, by one or more processors, at least each of two of a plurality of image plugins by analyzing pre-labeled images to determine metadata related to the pre-labeled images;
   comparing, by the one or more processors, the metadata determined by the at least two of the plurality of image plugins to the pre-labeled images;
   obtaining, by the one or more processors, at least one image, wherein the at least one image depicts at least one object;
   analyzing, by the one or more processors, the at least one image via the at least two of the plurality of image plugins, wherein the at least two of the plurality of image plugins are configured to identify one or more different aspects of the same at least one object depicted in the at least one image;
   determining, by the one or more processors, metadata related to the at least one image via the at least two of the plurality of image plugins;
   associating the metadata related to the at least one image with an image ID corresponding to the at least one image;
   filtering, by the one or more processors, the at least one image based on one or more predetermined metadata to generate at least one filtered image;
   sorting, by the one or more processors, the at least one filtered image to generate at least one sorted image;
   displaying, by the one or more processors, the at least one sorted image based on an organizational sequence of a webpage;
   displaying, by the one or more processors, navigation controls on the webpage; and
   displaying, by the one or more processors, the at least one sorted image according to a user interaction with the navigation controls on the webpage.

* * * * *